(12) United States Patent
Kubota et al.

(10) Patent No.: US 9,224,422 B2
(45) Date of Patent: Dec. 29, 2015

(54) CONTROL METHOD AND SYSTEM

(71) Applicant: FUJITSU LIMITED, Kawasaki-shi, Kanagawa (JP)

(72) Inventors: Norihide Kubota, Kawasaki (JP); Atsushi Igashira, Yokohama (JP); Kenji Kobayashi, Kawasaki (JP); Ryota Tsukahara, Kawasaki (JP); Hidejirou Daikokuya, Kawasaki (JP); Kazuhiko Ikeuchi, Kawasaki (JP); Chikashi Maeda, Kawasaki (JP); Takeshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 349 days.

(21) Appl. No.: 13/896,799

(22) Filed: May 17, 2013

(65) Prior Publication Data
US 2014/0009850 A1    Jan. 9, 2014

(30) Foreign Application Priority Data

Jul. 4, 2012  (JP) .................................. 2012-150243

(51) Int. Cl.
*G11B 20/12*    (2006.01)

(52) U.S. Cl.
CPC .... *G11B 20/1217* (2013.01); *G11B 2220/2508* (2013.01); *G11B 2220/2516* (2013.01)

(58) Field of Classification Search
CPC ..................................................... G11B 20/1217
USPC ............................................................ 360/49
See application file for complete search history.

(56) References Cited

U.S. PATENT DOCUMENTS

2006/0133244 A1*  6/2006  Tagiri et al. .................. 369/53.1

FOREIGN PATENT DOCUMENTS

| JP | 8-272540 | 10/1996 |
|---|---|---|
| JP | 2001-188658 | 7/2001 |
| JP | 2003-521759 | 7/2003 |
| WO | WO 00/67250 | 11/2000 |

* cited by examiner

*Primary Examiner* — Matthew Bradley
*Assistant Examiner* — Zubair Ahmed
(74) *Attorney, Agent, or Firm* — Staas & Halsey LLP

(57) ABSTRACT

A control method of controlling a disk storage unit, includes: obtaining, by a computer, for a plurality of sectors allocated on a disk included in the disk storage unit, track identifying information that identifies a track to which sectors belong, in a first order starting from a first start sector; and storing, if first track identifying information obtained in a first sector of the plurality of sectors does not match second track identifying information obtained in a second sector of the plurality of sectors immediately before the first sector, a data length from the first start sector to the second sector in a storage unit.

18 Claims, 21 Drawing Sheets

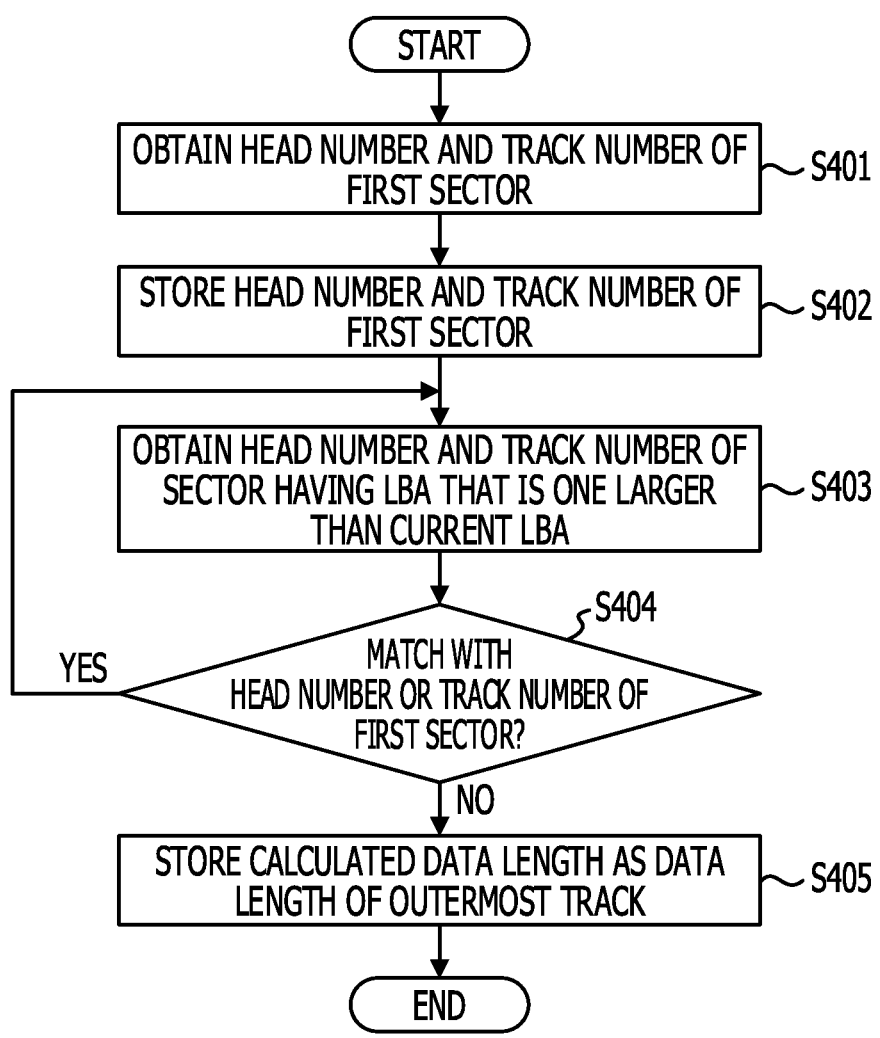

FIG. 13

ZONE COUNT = ((DATA LENGTH OF OUTERMOST TRACK)
             - (DATA LENGTH OF INNERMOST TRACK)) 64 KILOBYTES + 1

EXAMPLE: (512 - 256) 64 + 1 = 5  THEREFORE, THE ZONE COUNT IS 5.

| ZONE NUMBER | DATA LENGTH PER BLOCK |
|---|---|
| 0 | 512 KILOBYTES (64KB x 8) |
| 1 | 448 KILOBYTES (64KB x 7) |
| 2 | 384 KILOBYTES (64KB x 6) |
| 3 | 320 KILOBYTES (64KB x 5) |
| 4 | 256 KILOBYTES (64KB x 4) |

FIG. 15

$$\text{RATIO OF AREA ALLOCATED FOR EACH ZONE} = \frac{(\text{ZONE COUNT} - \text{ZONE NUMBER})^2 \times \pi - ((\text{ZONE COUNT} - \text{ZONE NUMBER}) - 1)^2 \times \pi}{(\text{ZONE COUNT})^2 \times \pi}$$

$$= \frac{(\text{ZONE COUNT} - \text{ZONE NUMBER}) \times 2 - 1}{(\text{ZONE COUNT})^2}$$

EXAMPLE)
RATIO OF AREA ALLOCATED FOR ZONE #0

$$\frac{(5-0) \times 2 - 1}{5^2} = 0.36 \quad 36\%$$

| ZONE | RATIO OF AREA | DATA LENGTH PER BLOCK |
|---|---|---|
| ZONE#0 | 36% | 512 KILOBYTES (64KB x 8) |
| ZONE#1 | 28% | 448 KILOBYTES (64KB x 7) |
| ZONE#2 | 20% | 384 KILOBYTES (64KB x 6) |
| ZONE#3 | 12% | 320 KILOBYTES (64KB x 5) |
| ZONE#4 | 4% | 256 KILOBYTES (64KB x 4) |

CONTROL METHOD AND SYSTEM

CROSS-REFERENCE TO RELATED APPLICATION

This application is based upon and claims the benefit of priority from the prior Japanese Patent Application No. 2012-150243, filed on Jul. 4, 2012, the entire contents of which are incorporated herein by reference.

FIELD

The embodiments discussed herein are related to a control method of controlling a disk storage unit and a system.

BACKGROUND

A magnetic disk storage unit is a storage unit that stores data to be processed by an information processing apparatus. The magnetic disk storage unit has one or a plurality of platters that store data. One platter has areas divided in ring shapes. Each area divided in a ring shape on the platter is referred to as a track. The track is further divided into units called sectors where data is recorded. The length of data that is able to be stored in one sector is fixed.

A related technology is disclosed in Japanese Laid-open Patent Publication No. 8-272540.

SUMMARY

According to one aspect of the embodiments, a control method of controlling a disk storage unit, includes: obtaining, by a computer, for a plurality of sectors allocated on a disk included in the disk storage unit, track identifying information that identifies a track to which sectors belong, in a first order starting from a first start sector; and storing, if first track identifying information obtained in a first sector of the plurality of sectors does not match second track identifying information obtained in a second sector of the plurality of sectors immediately before the first sector, a data length from the first start sector to the second sector in a storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a procedure for calculating a data length of the outermost track;
FIG. 13 indicates an example of an expression to calculate the number of zones;
FIG. 14 illustrates an example of information stored in a zone information storage unit;
FIG. 15 indicates an expression to calculate a ratio of a data area;
FIG. 16 illustrates an example of information stored in a zone information storage unit.

DESCRIPTION OF EMBODIMENTS

In a recording method for a magnetic disk storage unit, the total number of sectors in a track on the outer circumference side of a disk is larger than that in a track on the inner circumference side to increase a storage capacity. Accordingly, when a platter is rotated one turn, a larger amount of data is read from and written to an outer track on the platter when compared with an inner track on the platter. A speed at which data is read from and written to the platter becomes faster toward the outer circumference of the platter. A speed at which data is read from and written to the outermost track is fastest, and a speed at which data is read from and written to the innermost track is slowest.

For example, when data is read from or written to a magnetic disk storage unit, even if data has the same data length, a time taken to read or write the data may vary depending on the accessed track. Accordingly, when, for example, data is stored in a plurality of magnetic disk storage units in a distributed manner, read and write performance may be lowered.

Figure 1:
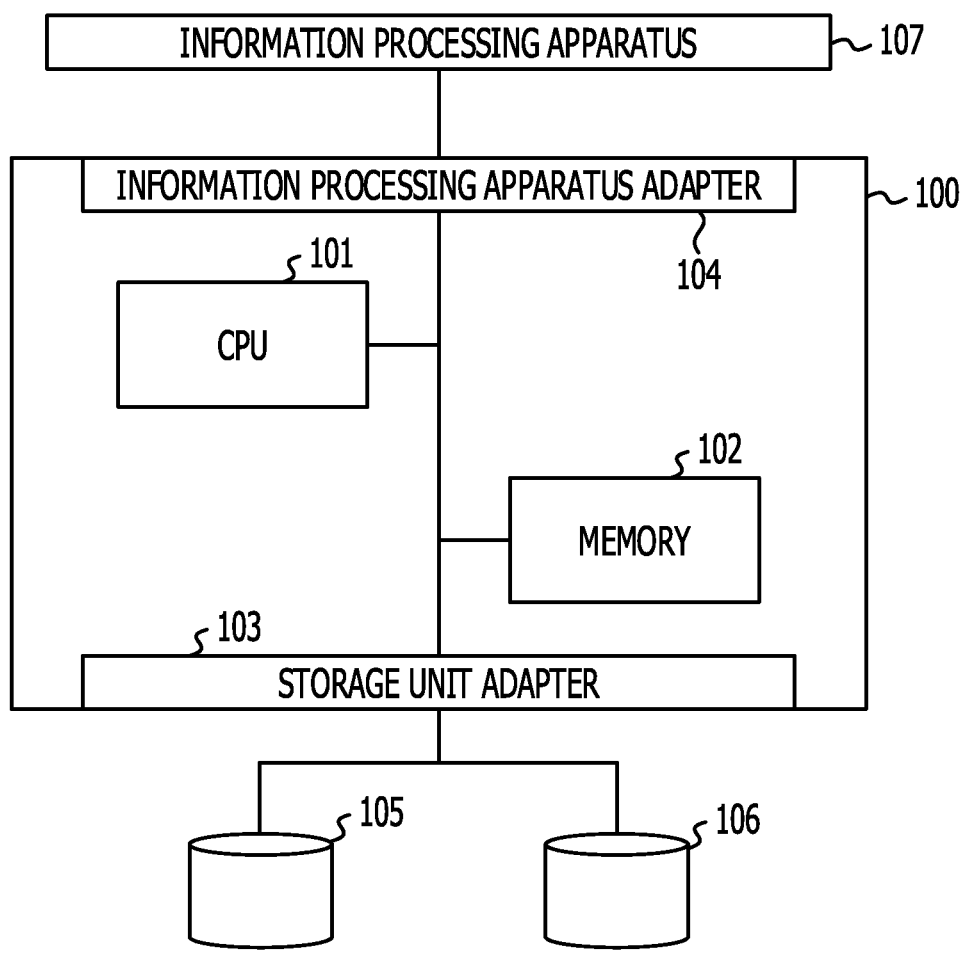
FIG. 1 illustrates an example of a system.

FIG. 1 illustrates an example of a system. The system 1 in FIG. 1 includes a controller 100, magnetic disk storage units 105 and 106, and an information processing apparatus 107.

The controller 100 includes a central processing unit (CPU) 101, a memory 102, a storage unit adapter 103, and an information processing apparatus adapter 104, all of which are mutually coupled through a bus.

The CPU 101 executes calculation processing or other processing that is executed by the controller 100. The memory 102 stores information to be used in the calculation processing executed by the CPU 101. Programs to be executed by the CPU 101 may be loaded in the memory 102.

The controller 100 is coupled through the storage unit adapter 103 to the magnetic disk storage units 105 and 106, and is coupled through the information processing apparatus adapter 104 to the information processing apparatus 107 that uses a storage unit. The storage unit adapter 103 is coupled to the magnetic disk storage units 105 and 106 by using, for example, a Small Computer System Interface (SCSI). Although, in FIG. 1, the magnetic disk storage units 105 and 106 are coupled to the controller 100, any number of magnetic disk storage units may be coupled to the controller 100.

The magnetic disk storage units 105 and 106 may be magnetic disk storage units that are able to perform data communication by the SCSI standard. The length of data that is able to be stored in one sector is 520 bytes (512-byte storage area and 8-byte redundant area).

The information processing apparatus adapter 104 may be coupled to the information processing apparatus 107 through, for example, a fiber channel or a storage area network (SAN).

The information processing apparatus 107 may be, for example, a server apparatus or personal computer (PC) that processes data stored in the magnetic disk storage unit 105 or 106.

Figure 2:
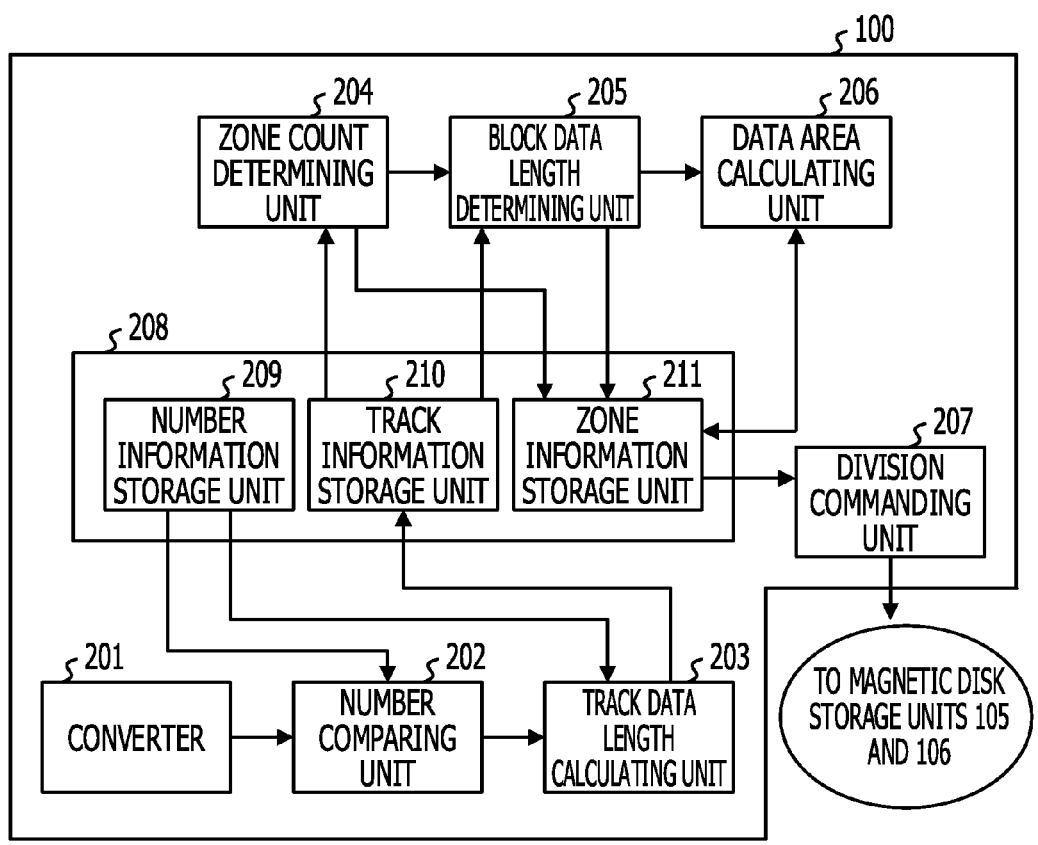
FIG. 2 illustrates a functional structure of a controller.

FIG. 2 illustrates a functional structure of a controller. The controller 100 includes a converter 201, a number comparing unit 202, a track data length calculating unit 203, a zone count determining unit 204, a block data length determining unit 205, a data area calculating unit 206, a division commanding unit 207, and a storage unit 208. The storage unit 208 includes a number information storage unit 209, a track information storage unit 210, and a zone information storage unit 211.

The converter 201 issues a physical address converting command to a logical block address (LBA). The LBA acquires the head number and track number of an assigned sector. The physical address converting command is a command with which the LBA assigned to a sector identifies the head number and track number of the sector. The magnetic disk storage units 105 and 106 may be storage units that perform processing as commanded by a physical address converting command and send a processing result to the controller 100.

The number comparing unit 202 determines whether there is a match between the head number and track number stored in the number information storage unit 209 and the head number and track number obtained by the converter 201. The number comparing unit 202 stores the head number and track number in the number information storage unit 209 if desired.

The track data length calculating unit 203 calculates the data length of a track on the platter included in the magnetic disk storage units 105 and 106, based on information about the head number and track number of a sector, the information being stored in the storage unit 208. The track data length calculating unit 203 stores the calculated data length of the track in the track information storage unit 210.

The zone count determining unit 204 determines the number of zones by using the data length of the track, which has been calculated by the track data length calculating unit 203, and assigns zone numbers to the zones, the zone numbers being used to identify the zones. The zone count determining unit 204 stores the assigned zone numbers in the zone information storage unit 211 if desired.

The block data length determining unit 205 determines the data length of a block in each zone determined by the zone count determining unit 204 by using the data length of the track, which has been calculated by the track data length calculating unit 203. The block data length determining unit 205 stores in the storage unit 208 the determined data length of the block and the number of the zone that includes the block having the data length in relation to each other.

The data area calculating unit 206 calculates a ratio of a data area occupied by each zone to the entire data area in the corresponding magnetic disk storage unit 105 or 106 by using the number of zones and the zone number determined by the zone count determining unit 204. The data area calculating unit 206 stores the calculated data area ratio of each zone in the storage unit 208.

The division commanding unit 207 divides the data area in the magnetic disk storage units 105 and 106 coupled to the controller 100, based on the information stored in the storage unit 208. The converter 201, number comparing unit 202, track data length calculating unit 203, zone count determining unit 204, block data length determining unit 205, data area calculating unit 206, and division commanding unit 207, which are illustrated in FIG. 2, may function when, for example, the CPU 101 included in the controller 100 in FIG. 1 executes programs stored in the memory 102.

The storage unit 208 stores information created or to be referenced by the functional units. The storage unit 208 includes the number information storage unit 209, track information storage unit 210, and zone information storage unit 211.

The number information storage unit 209 stores a sector obtained by the converter 201 and the head number and track number of the sector in relation to each other.

The track information storage unit 210 stores the data length of the track, which has been calculated by the track data length calculating unit 203.

The zone information storage unit 211 stores the number of zones determined by the zone count determining unit 204. The zone information storage unit 211 stores the zone numbers determined by the zone count determining unit 204, the data length per block in each zone, which has been determined by the block data length determining unit 205, and the ratio of the data area in each zone to the entire data area in the corresponding magnetic disk storage unit 105 or 106 determined by the data area calculating unit 206, in relation to one another.

The storage unit 208 may be, for example, the memory 102 included in the controller 100 illustrated in FIG. 1. The head number is a number assigned to a magnetic head included in the magnetic disk storage unit so that the magnetic head to be used to read data from or write data to the platter is identified. The magnetic disk storage unit 105 or 106 has platters, on both surfaces of which data is able to be stored. One magnetic head is provided for one recoding surface of a platter. For examples, sectors in which data is read and written by using heads with different head numbers belong to different recording surfaces of platters.

The track number is a number assigned to a track so that the track on the platter is identified. For example, sectors having different track numbers belong to different tracks. Although the head number and track number are information in a numeric form, the numbers may be in non-numeric form if they are identifiers at are able to identify a head and a track.

Figure 3:
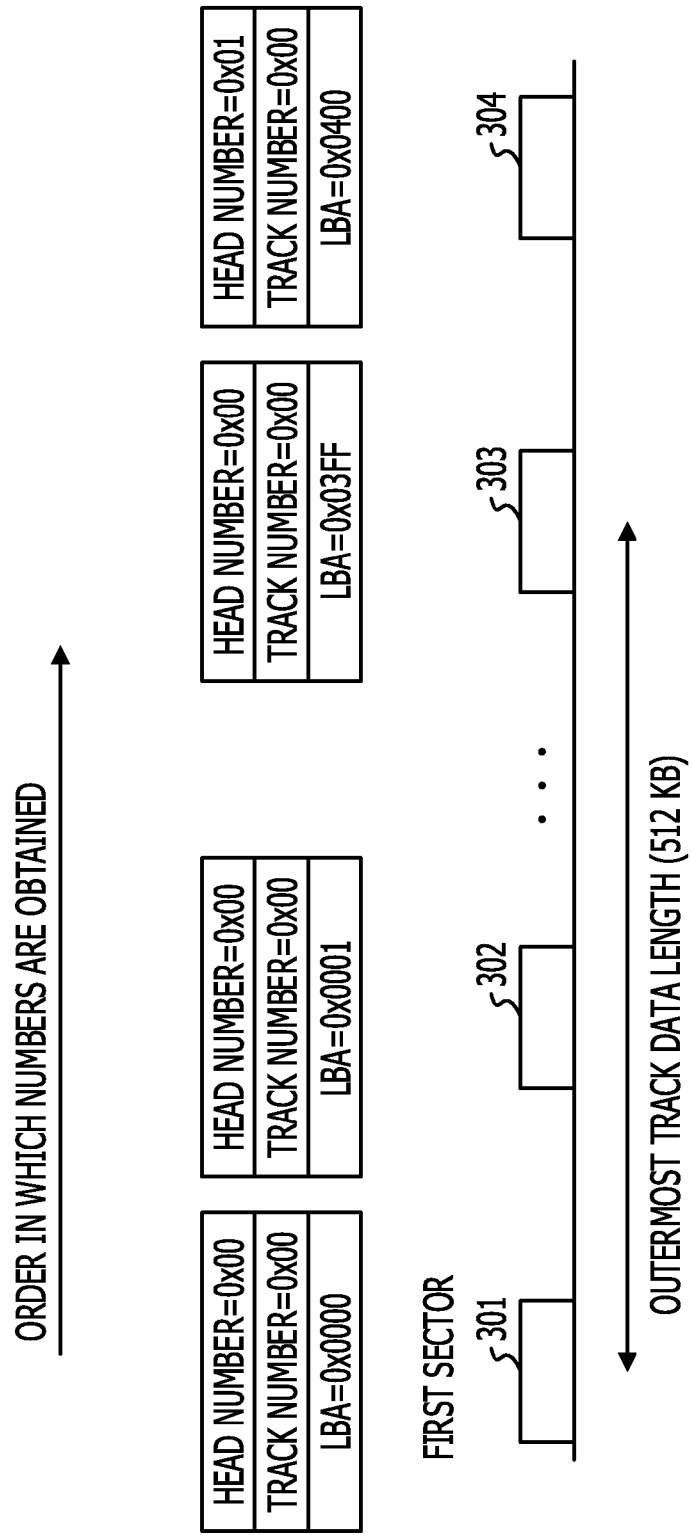
FIG. 3 illustrates an example of calculating a data length of the outermost track on a platter.

FIG. 3 illustrates an example of calculating a data length of the outermost track on a platter. FIG. 4 illustrates an example of a procedure for calculating the data length of the outermost track.

The converter 201 obtains the head number and track number of a sector having an LBA of 0x0000 (smallest LBA) (S401). The sector having the LBA 0x0000 may be described as the first sector. In FIG. 3, the first sector 301 is illustrated as the first sector having the LBA 0x0000. In the magnetic disk storage units 105 and 106, the first sector 301 having the LBA 0x0000 may be in the outermost track. When the converter 201 issues a physical address converting command to the first sector 301, a head number of 0x00 and a track number of 0x00 assigned to the first sector 301 are obtained as illustrated in FIG. 3.

After the head number and track number of the first sector 301 have been obtained, the converter 201 stores the obtained head number and track number of the first sector 301 in the number information storage unit 209 (S402).

The converter 201 obtains the head number and track number of a sector having an LBA that is one larger than the LBA of the current sector (S403). For example, when the converter 201 issues a physical address converting command to a sector 302, illustrated in FIG. 3, having an LBA of 0x0001, its head number and track number are obtained.

After the head number and track number of sector 302 have been obtained, the number comparing unit 202 compares the head number of the first sector 301 and the head number of sector 302. The number comparing unit 202 compares the track number of the first sector 301 and the track number of sector 302. The number comparing unit 202 determines whether, in the first sector 301 and sector 302, there is a match between the head numbers and between the track numbers (S404). If the number comparing unit 202 determines that the head number and track number of sector 302 match the head number and track number of the first sector 301, the processing returns to operation S403. The converter 201 executes operation S403, after which the converter 201 executes operation S404.

The processing in operations S403 and S404 is repeated until the number comparing unit 202 detects in operation S404 that the obtained head number or track number differs from the head number or track number stored in the number information storage unit 209. For example, in FIG. 3, if sector 302 is taken as a sector to be compared by the number comparing unit 202, after a determination made in operation S404, the processing in operations S403 and S404 is repeated because the head number and track number of sector 302 are the same as the head number and track number of the first sector 301.

If the number comparing unit 202 determines in operation S404 that the obtained head number or track number differs from the head number or track number stored in the number information storage unit 209, the number comparing unit 202 sends a notification to the track data length calculating unit 203. Upon receipt of the notification from the number comparing unit 202, the track data length calculating unit 203 calculates the data length of sectors from the first sector 301 to the current sector, which is, for example, a sector having an LBA that is one smaller than the LBA of the sector in which a different head number or a different track number has been detected by the number comparing unit 202. The track data length calculating unit 203 stores the calculated data length in the track information storage unit 210 as the data length of the outermost track (S405).

If, for example, sector 304 is taken as a sector to be compared in operation S404, a head number of 0x01 assigned to sector 304 differs from a head number of 0x00, assigned to the first sector 301, that is stored in the number information storage unit 209. Therefore, operation S405 is executed by the track data length calculating unit 203; the data length of sectors from the first sector 301 to sector 303 illustrated in FIG. 3 is calculated. If the calculated data length is, for example, 512 kilobytes, the track data length calculating unit 203 stores, in the track information storage unit 210, that the data length of the outermost track is 512 kilobytes.

The data length of the outermost track in the magnetic disk storage units 105 and 106 may be calculated by the procedure described above.

Figure 5A:
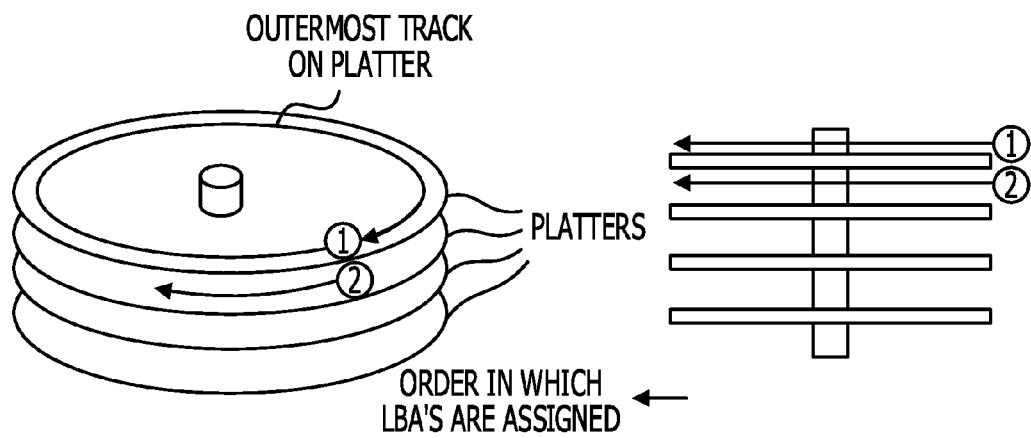
FIGS. 5A and 5B each illustrate an example of a magnetic disk storage unit.
Figure 5B:
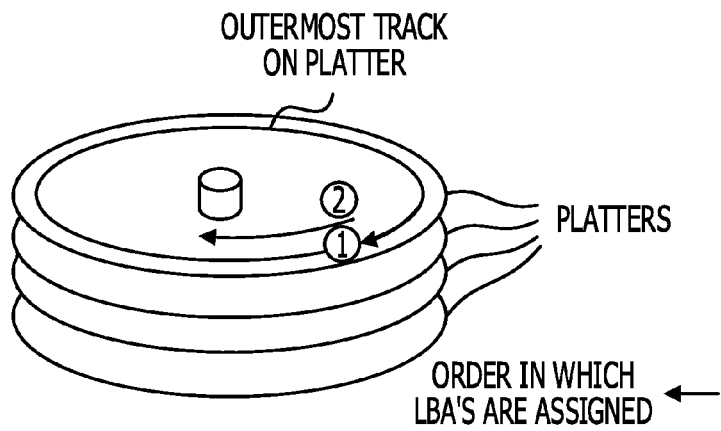

FIGS. 5A and 5B illustrate an example of a magnetic disk storage unit. In FIGS. 5A and 5B, the method of assigning LBAs differs. FIG. 5A illustrates a magnetic disk storage unit in which LBAs are assigned in the order of platters. In FIG. 5A, the track data length calculating unit 203 calculates the data length of the outermost track when the number comparing unit 202 detects a different head number as illustrated in FIG. 3. FIG. 5B illustrates a magnetic disk storage unit in which LBAs are assigned in the order of tracks on the same platter. In FIG. 5B, the track data length calculating unit 203 calculates the data length of the outermost track when the number comparing unit 202 detects a different track number.

Figure 6:
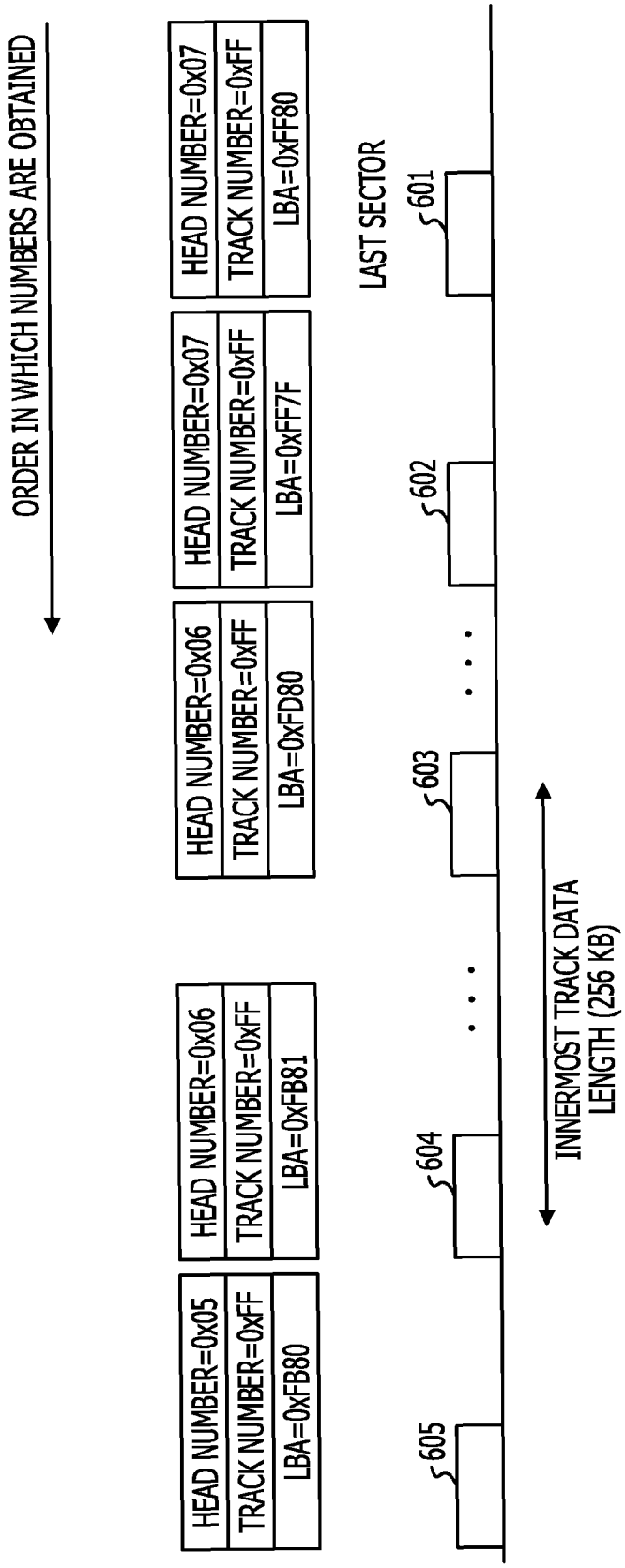
FIG. 6 illustrates an example of calculating a data length of the innermost track on a platter.
Figure 7:
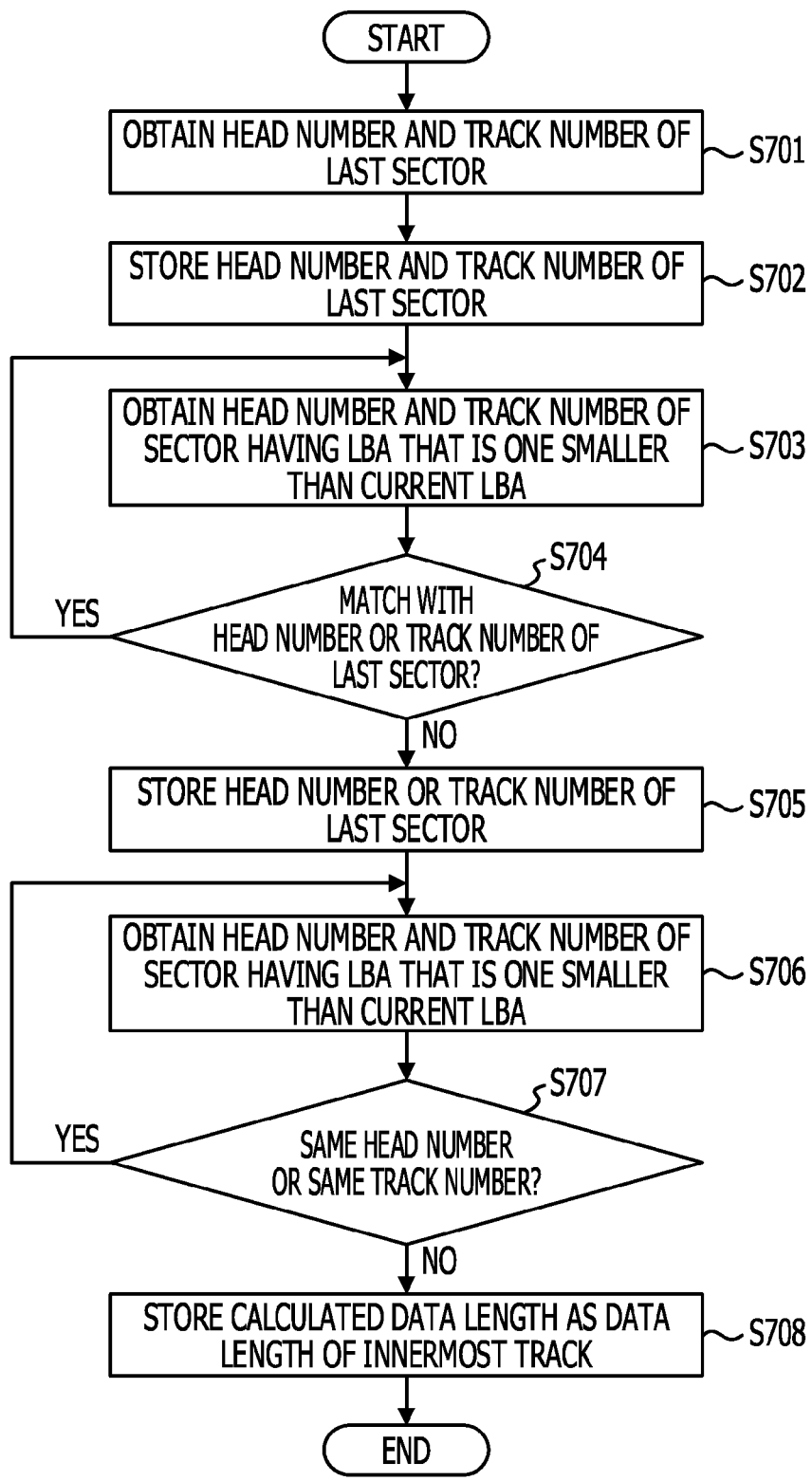
FIG. 7 illustrates an example of a procedure for calculating a data length of the innermost track.

FIG. 6 illustrates an example of calculating the data length of the innermost track on a platter. FIG. 7 illustrates an example of a procedure for calculating the data length of the innermost track.

The converter 201 obtains the head number and track number of a sector having the maximum LBA in terms of the capacity of the magnetic disk storage unit (S701). The sector having the maximum LBA in terms of the capacity of the magnetic disk storage unit may be described as the last sector. In FIG. 6, the last sector 601 is illustrated as the last sector having an LBA of 0xFF80. In the magnetic disk storage units 105 and 106, the last sector 601 is in the innermost track. For example, the converter 201 issues a physical address converting command to the last sector 601 illustrated in FIG. 6 to obtain a head number of 0x07 and a track number of 0xFF assigned to the last sector 601.

After having obtained the head number and track number of the last sector 601, the converter 201 stores the obtained head number and track number of the last sector 601 in the number information storage unit 209 (S702).

The converter 201 obtains the head number and track number of a sector having an LBA that is one smaller than the current LBA (S703). For example, after executing operations S701 and S702, the converter 201 issues a physical address converting command to sector 602 with an LBA of 0xFF7F, which is one smaller than the LBA of the last sector 601 to obtain its head number and track number.

After having obtained the head number and track number of sector 602, the number comparing unit 202 compares the head number of sector 602 with the head number of the last sector 601 that is stored in the number information storage unit 209. The number comparing unit 202 compares the track number of sector 602 with the track number of the last sector 601 that is stored in the number information storage unit 209. The number comparing unit 202 determines, based on the comparison results, whether the last sector 601 and sector 602 have the same head number and the same track number (S704). If the number comparing unit 202 determines that the last sector 601 and sector 602 have the same head number and the same track number, the converter 201 execute operation S703 again, after which the number comparing unit 202 executes operation S704.

After that, operations S703 and S704 are repeated until the number comparing unit 202 detects in operation S704 that the obtained head number or track number differs from the head number or track number stored in the number information storage unit 209. For example, in FIG. 6, if sector 602 is taken as a sector to be compared by the number comparing unit 202, after a determination has been made in operation S704, operations S703 and S704 are repeated because the head number and track number of sector 602 are the same as the head number and track number of the last sector 601.

If the number comparing unit 202 determines in operation S704 that the obtained head number or track number differs from the head number or track number stored in the number information storage unit 209, the number comparing unit 202 sends a notification to the track data length calculating unit 203. Upon receipt of the notification from the number comparing unit 202, the track data length calculating unit 203 stores the head number and track number of the current sector, which is, for example, the sector in which a different head number or a different track number has been detected by the number comparing unit 202, in the number information storage unit 209 (S705).

If, for example, sector 603 is taken as a sector to be compared by the number comparing unit 202, a head number of 0x06 assigned to sector 603 differs from a head number of 0x07, assigned to the last sector 601, that is stored in the number information storage unit 209. Therefore, the head number 0x06 and track number 0xFF of sector 603 are stored in the number information storage unit 209 in operation S705 executed by the track data length calculating unit 203.

After operation S705 has been executed, the converter 201 obtains the head number and track number of a sector having an LBA that is one smaller than the current LBA (S706).

The number comparing unit 202 compares the head number obtained by the converter 201 in operation S706 with the head number of sector 603 that is stored in the number information storage unit 209. The number comparing unit 202 compares the track number obtained by the converter 201 in operation S706 with the track number of sector 603 that is stored in the number information storage unit 209. The number comparing unit 202 determines, based on the comparison results, whether the head numbers are the same and the track numbers are the same (S707). If the number comparing unit 202 determines that the head number and track number obtained by the converter 201 in operation S706 respectively match the head number and track number of sector 603, the processing returns to operation S706. The converter 201 executes operation S706, after which the number comparing unit 202 executes operation S707.

After that, operations S706 and S707 are repeated until the number comparing unit 202 detects in operation S707 that the obtained head number or track number differs from the head number or track number stored in the number information storage unit 209. For example, in FIG. 6, if sector 604 is taken as a sector to be compared by the number comparing unit 202, after a determination made in operation S707, operations S706 and S707 are repeated because the head number and track number of sector 604 are the same as the head number and track number of the sector 603.

If the number comparing unit 202 determines in operation S707 that the obtained head number or track number differs from the head number or track number stored in the number information storage unit 209, the number comparing unit 202 sends a notification to the track data length calculating unit 203. Upon receipt of the notification from the number comparing unit 202, the track data length calculating unit 203 calculates the data length of sectors from sector 603 to the current sector, which is, for example, a sector having an LBA that is one smaller than the LBA of the sector in which a different head number or a different track number has been detected by the number comparing unit 202. The track data length calculating unit 203 stores the calculated data length in the track information storage unit 210 as the data length of the innermost track (S708).

If, for example, sector 605 is taken as a sector to be compared in operation S707, a head number of 0x05 assigned to sector 605 differs from a head number of 0x06, assigned to sector 603, that is stored in the number information storage unit 209. Therefore, operation S708 is executed by the track data length calculating unit 203; the data length of sectors from sectors 603 to 604 illustrated in FIG. 6 is calculated. If the calculated data length is, for example, 256 kilobytes, the track data length calculating unit 203 stores, in the track information storage unit 210, that the data length of the innermost track is 256 kilobytes.

The data length of the innermost track in the magnetic disk storage units 105 and 106 are calculated by the procedure described above.

The data length of the innermost track may be set to the data length of sectors from sector 603 to sector 604. The magnetic disk storage unit may include a storage area that is not used by the user (user unused area), in which data is not rewritten by the user (the user is not permitted to rewrite data), in addition to a storage area in which data can be rewritten in response to a request from the user. The user unused area is allocated in, for example, a track near the innermost circumference of the platter in the magnetic disk storage unit. The user unused area is a storage area to be used to store configuration information about the magnetic disk storage unit or to be used for repair at the occurrence of a failure. Since the user unused area may not be allocated in an entire track, a track in the vicinity of the user unused area may include both a storage area in which data can be rewritten in response to a request from the user and the user unused area. When, for example, a user unused area is allocated in a track near the innermost circumference of the platter in the magnetic disk storage units 105 and 106, a sector included in the user unused area may exist in the track including the last sector 601. Accordingly, as illustrated in FIG. 6, the data length of sectors from sector 603 to sector 604 may be set as data length of the innermost track without setting the track including the last sector 601 as the innermost track.

Accordingly, possibility of the track including the user unused area being processed as the innermost track may be suppressed. The user unused area may be allocated in a track near the innermost circumference of the platter. If the user unused area is allocated in a track near the outermost circumference of the platter, the data length of the outermost track may be the data length of sectors from a sector in which a different head number has been first detected to a sector immediately before a sector in which a different head number has been detected next.

The data length of the outermost track is calculated in FIG. 4, and the data length of the innermost track is calculated in FIG. 7. When LBAs are assigned as illustrated in FIG. 5B, the data length of a track other than the outermost track and innermost track may be calculated.

Figure 8:
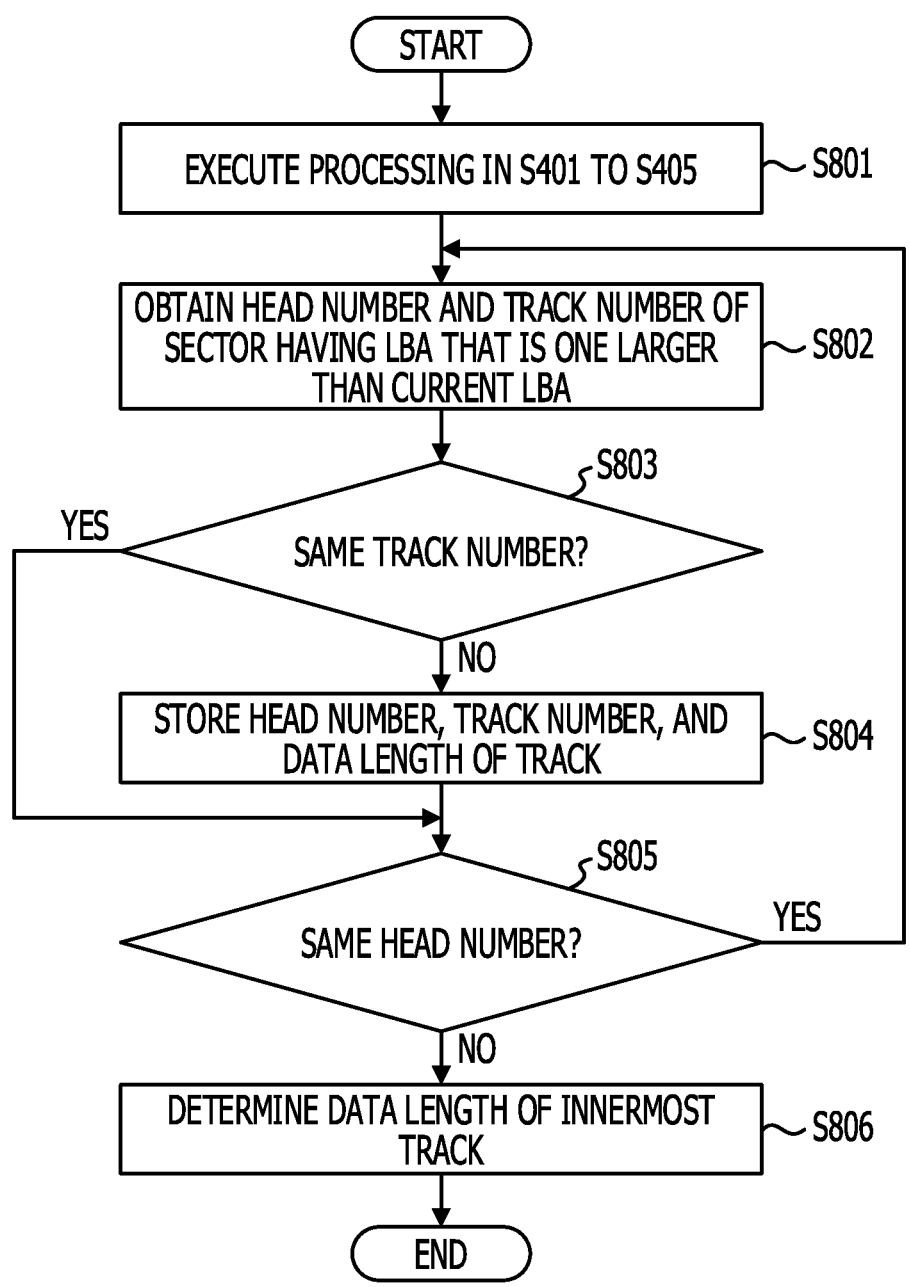
FIG. 8 illustrates an example of a procedure for calculating data lengths of tracks.

FIG. 8 illustrates an example of a procedure for calculating data lengths of tracks. In FIG. 8, the data length of each track between the outermost track and innermost track of a platter is calculated.

The controller 100 executes operations S401 to S405 illustrated in FIG. 4 to calculate the data length of the outermost track (S801). Operation S801 may be substantially the same as or similar to operations S401 to S405 in FIG. 4.

The converter 201 obtains the head number and track number of a sector having an LBA that is one larger than the LBA of the current sector (S802). For example, operation S802 may be substantially the same as or similar to operation S403 in FIG. 4.

After execution of operation S802, the number comparing unit 202 compares the track number obtained in operation S802 with the track number stored in the number information storage unit 209. The number comparing unit 202 determines, based on the comparison result, whether the track numbers are the same (S803). If the number comparing unit 202 determines in operation S803 that the track numbers are the same, the number comparing unit 202 executes operation S805.

If the number comparing unit 202 determines in operation S803 that the track numbers are not the same, the number comparing unit 202 sends a notification to the track data length calculating unit 203. Upon receipt of the notification from the number comparing unit 202, the track data length calculating unit 203 calculates the data length of sectors from the sector taken when the numbers have been stored in the number information storage unit 209 to a sector having an LBA that is one smaller than the current LBA. The track data length calculating unit 203 stores the head number and track number of the current sector and stores the calculated data length as the data length of the outermost track in the track information storage unit 210 (S804). After the track data length calculating unit 203 has executed operation S804, the number comparing unit 202 executes operation S805.

In operation S805, the number comparing unit 202 compares the head number obtained in operation S802 with the head number stored in the number information storage unit 209. The number comparing unit 202 determines, based on the comparison result, whether the head numbers are the same. If the number comparing unit 202 determines that the head numbers are the same, the number comparing unit 202 executes processing staring from operation S802.

If the number comparing unit 202 determines in operation S805 that the track numbers are not the same, the number comparing unit 202 sends a notification to the track data length calculating unit 203. Upon receipt of the notification from the number comparing unit 202, the track data length calculating unit 203 determines that the track, the data length of which has been calculated at the last but one, is the innermost track, and determines the data length calculated at the last but one as the data length of the innermost track (S806).

After the track data length calculating unit 203 has executed operation S806, the controller 100 terminates the track data length calculation processing illustrated in FIG. 8.

The data lengths of tracks are obtained sequentially from the outermost track by the procedure described above. When a head number is changed, for example, when a switchover of a recording surface of a platter is detected, the track data length calculation processing is terminated. In FIG. 8, when operation S804 is first executed, the data length stored in the track information storage unit 210 by the track data length calculating unit 203 may be the data length of the outermost track. In operation S806, the data length stored in the track information storage unit 210 by the track data length calculating unit 203 may be the data length of the innermost track.

Figure 9:
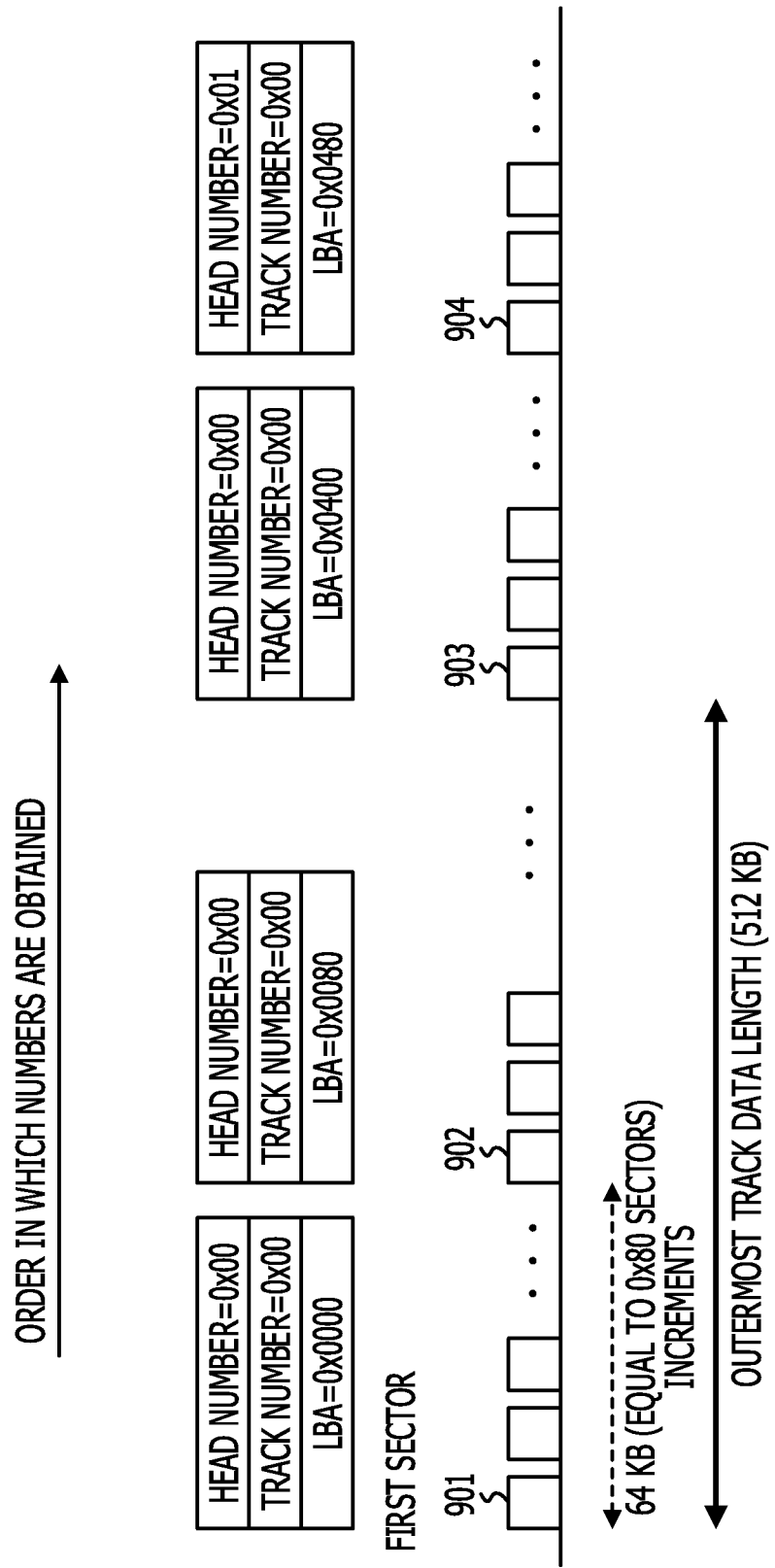
FIG. 9 illustrates an example of calculating a data length of the outermost track.
Figure 10:
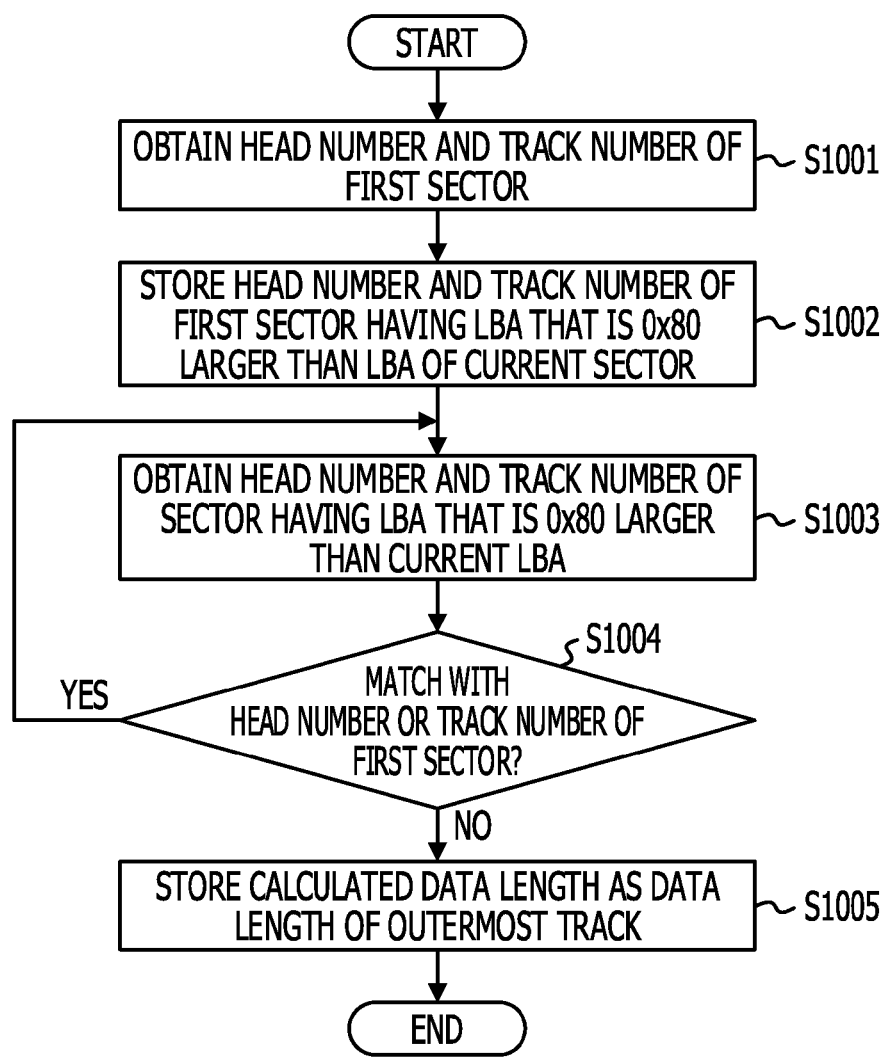
FIG. 10 illustrates an example of a procedure for calculating a data length of the outermost track.

FIG. 9 illustrates an example of calculating the data length of the outermost track. FIG. 10 illustrates an example of a procedure for calculating the data length of the outermost track.

The converter 201 obtains the head number and track number of a sector having an LBA of 0x0000 (S1001). The sector having the LBA 0x0000 may be described as the first sector. In FIG. 9, the first sector 901 is illustrated as the first sector having the LBA 0x0000. In the magnetic disk storage units 105 and 106, the first sector 901 having the LBA 0x0000 may be in the outermost track. When the converter 201 issues a physical address converting command to the first sector 901, a head number of 0x00 and a track number of 0x00 assigned to the first sector 901 are obtained as illustrated in FIG. 9.

After the head number and track number of the first sector 901 have been obtained, the converter 201 stores the obtained head number and track number of the first sector 901 in the number information storage unit 209 (S1002).

The converter 201 obtains the head number and track number of a sector having an LBA that is 0x80 (that is 128 in decimal or is equivalent to a data length of 64 kilobytes) larger than the LBA of the current sector (S1003). The value of 0x80 may be appropriately changed. For example, when the converter 201 issues a physical address converting command to sector 902 having an LBA of 0x0080 illustrated in FIG. 9, the head number and track number are obtained.

After the head number and track number of sector 902 have been obtained, the number comparing unit 202 compares the head number of the first sector 901 and the head number of sector 902. The number comparing unit 202 compares the track number of the first sector 901 and the track number of sector 902. The number comparing unit 202 determines whether, in the first sector 901 and sector 302, there is a match between the head numbers and between the track numbers (S1004). If the number comparing unit 202 determines that the head number and track number of sector 902 match the head number and track number of the first sector 901, the processing returns to operation S1003. The converter 201 executes the above processing, after which the converter 201 executes operation S1004.

After that, operations S1003 and S1004 are repeated until the number comparing unit 202 detects in operation S1004 that the obtained head number or track number differs from the head number or track number stored in the number information storage unit 209. For example, in FIG. 9, if sector 902 is taken as a sector to be compared by the number comparing unit 202, after a determination made in operation S1004, operations S1003 and S1004 are repeated because the head number and track number of sector 902 are the same as the head number and track number of the first sector 901.

If the number comparing unit 202 determines in operation S1004 that the obtained head number or track number differs from the head number or track number stored in the number information storage unit 209, the number comparing unit 202 sends a notification to the track data length calculating unit 203. Upon receipt of the notification from the number comparing unit 202, the track data length calculating unit 203 calculates the data length of sectors from the first sector 901 to the current sector, which is, for example, a sector having an LBA that is 0x80 smaller than the LBA of the sector in which a different head number or a different track number has been detected by the number comparing unit 202. The track data length calculating unit 203 stores the calculated data length in the track information storage unit 210 as an approximate value of the data length of the outermost track (S1005).

If, for example, sector 904 is taken as a sector to be compared in operation S1004, a head number of 0x01 assigned to sector 904 differs from a head number of 0x00, assigned to the first sector 901, that is stored in the number information storage unit 209. Therefore, operation S1005 is executed by the track data length calculating unit 203; and the data length of sectors, illustrated in FIG. 9, from the first sector 901 to a sector having an LBA that is one smaller than the LBA of sector 903 is calculated. If the calculated data length is, for example, 512 kilobytes, the track data length calculating unit 203 stores, in the track information storage unit 210, that an approximate value of the data length of the outermost track is 512 kilobytes.

An approximate value of the data length of the outermost track in the magnetic disk storage unit 105 or 106 is calculated by the procedure described above.

Since the head numbers and track numbers of sectors are obtained in 0x80 increments, an approximate value of the data length of a track may be obtained by a smaller amount of calculation or in a shorter calculation time.

Figure 11:
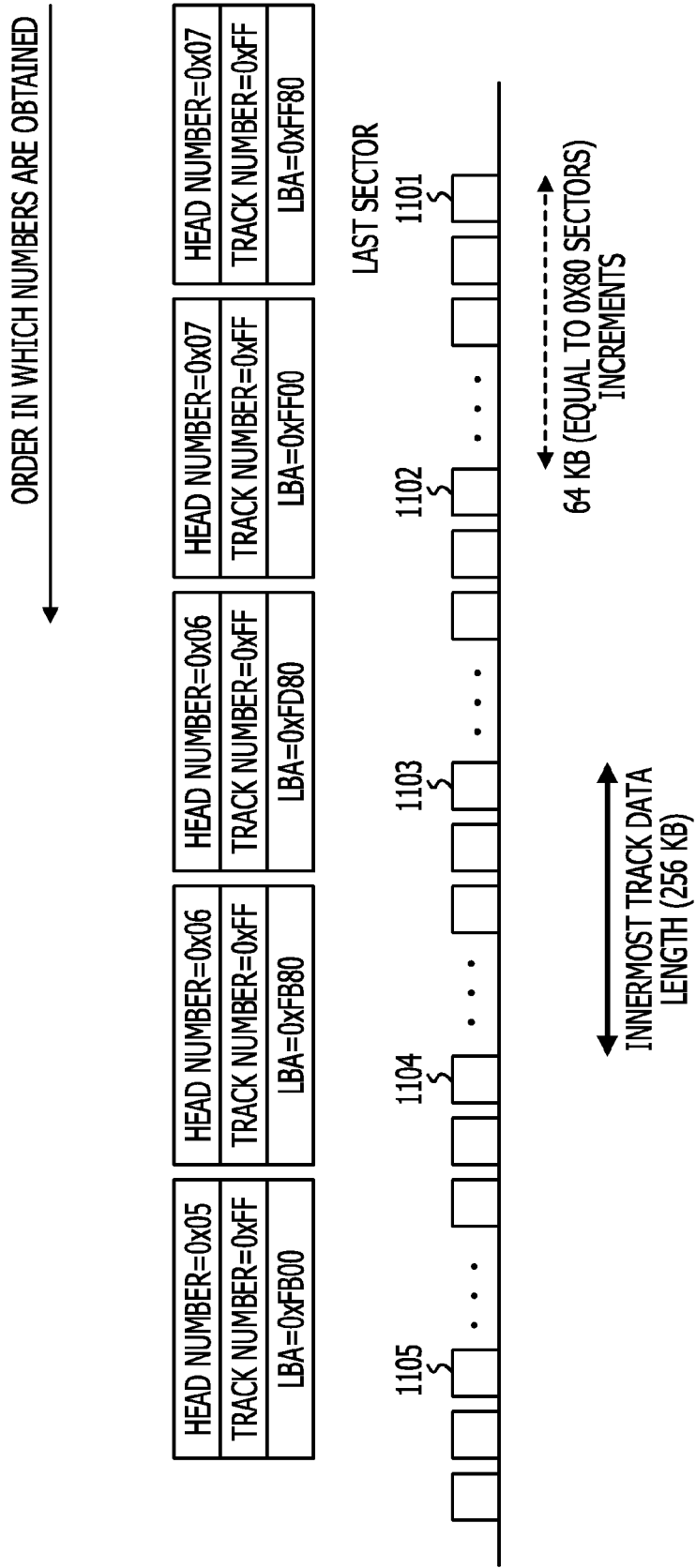
FIG. 11 illustrates an example of calculating a data length of the innermost track on a platter.
Figure 12:
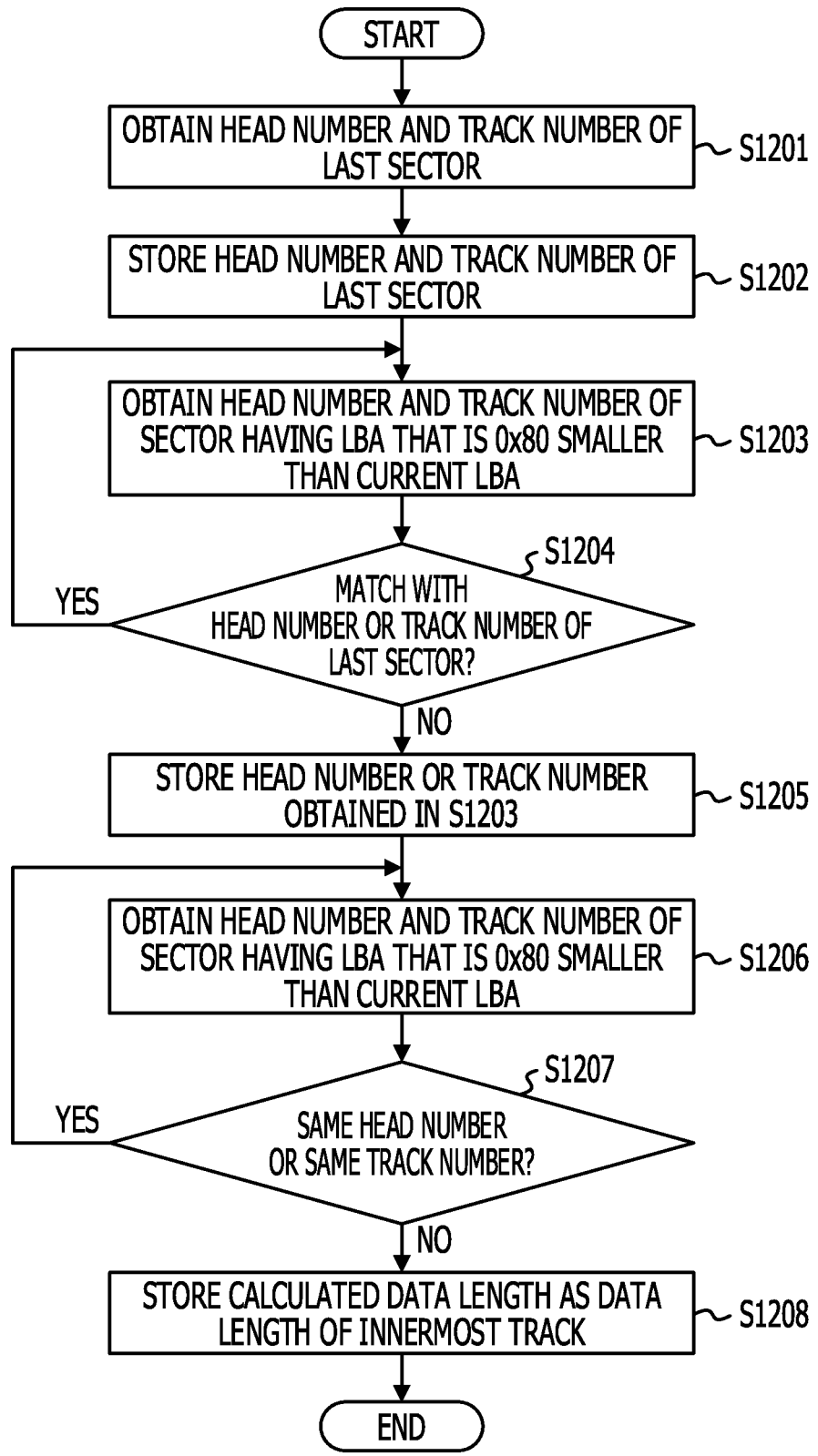
FIG. 12 illustrates an example of a procedure for calculating a data length of the innermost track.

FIG. 11 illustrates an example of calculating the data length of the innermost track on a platter. FIG. 12 illustrates an example of a procedure for calculating the data length of the innermost track.

The converter 201 obtains the head number and track number of a sector having the maximum LBA in terms of the capacity of a magnetic disk storage unit (S1201). The sector having the maximum LBA in terms of the capacity of the magnetic disk storage unit may be described as the last sector. In FIG. 11, the last sector 1101 is illustrated as the last sector having an LBA of 0xFF80. In the magnetic disk storage units 105 and 106, the last sector 1101 may be in the innermost track. For example, the converter 201 issues a physical address converting command to the last sector 1101 illustrated in FIG. 11 to obtain a head number of 0x07 and a track number of 0xFF assigned to the last sector 1101.

After having obtained the head number and track number of the last sector 1101, the converter 201 stores the obtained head number and track number of the last sector 1101 in the number information storage unit 209 (S1202).

The converter 201 obtains the head number and track number of a sector having an LBA that is 0x80 smaller than the LBA of the current sector (S1203). For example, the converter 201 issues a physical address converting command to sector 1102 with an LBA of 0xFF00 to obtain its head number and track number.

After having obtained the head number and track number of sector 1102, the number comparing unit 202 compares the head number obtained in operation S1203 with the head number stored in the number information storage unit 209. The number comparing unit 202 compares the track number of sector 1102 that has been obtained in operation S1203 with the track number of the last sector 1101 that is stored in the number information storage unit 209. The number comparing unit 202 determines, based on the comparison results, whether there is a match between the track number of the last sector 1101 that is stored in the number information storage unit 209 and the track number of sector 1102 that has been obtained in operation S1203 (S1204). If the number comparing unit 202 determines that the track number of the last sector 1101 and the track number of sector 1102 are the same, the processing returns to operation S1203. The converter 201 executes operation S1203, after which the number comparing unit 202 executes operation S1204.

After that, operations S1203 and S1204 are repeated until the number comparing unit 202 detects in operation S1204 that the obtained head number or track number differs from the head number or track number stored in the number information storage unit 209. For example, in FIG. 11, if sector 1102 is taken as a sector to be compared by the number comparing unit 202, after a determination made in operation S1206, operations S1203 and S1204 are repeated because the head number and track number of sector 1102 are the same as the head number and track number of the last sector 1101.

If the number comparing unit 202 determines in operation S1204 that the head number or track number obtained in operation S1203 differs from the head number or track number stored in the number information storage unit 209, the number comparing unit 202 sends a notification to the track data length calculating unit 203. Upon receipt of the notification from the number comparing unit 202, the track data length calculating unit 203 stores the head number and track number of the current sector, which is, for example, the sector in which a different head number or a different track number has been detected by the number comparing unit 202, in the number information storage unit 209 (S1205).

If, for example, sector 1103 is taken as a sector to be compared by the number comparing unit 202, a head number of 0x06 assigned to sector 1103 differs from a head number of 0x07, assigned to the last sector 1101, that is stored in the number information storage unit 209. Therefore, the head number 0x06 and track number 0xFF of sector 1103 are stored in the number information storage unit 209 in operation S1205 executed by the track data length calculating unit 203.

After operation S1205 has been executed, the converter 201 obtains the head number and track number of a sector having an LBA that is 0x80 smaller than the current LBA (S1206).

The number comparing unit 202 compares the head number obtained by the converter 201 in operation S1206 with the head number of sector 1103 that is stored in the number information storage unit 209. The number comparing unit 202 compares the track number obtained by the converter 201 in operation S1206 with the track number of sector 1103 that is stored in the number information storage unit 209. The number comparing unit 202 determines, based on the comparison results, whether the head numbers are the same and the track numbers are the same (S1207). If the number comparing unit 202 determines that the head number and track number obtained by the converter 201 in operation S1206 respectively match the head number and track number of sector 1103, the processing returns to operation S1206. Then, the converter 201 executes operation S1206, after which the number comparing unit 202 executes operation S1207.

After that, operations S1206 and S1207 are repeated until the number comparing unit 202 detects in operation S1207 that the obtained head number or track number differs from the head number or track number stored in the number information storage unit 209. For example, in FIG. 11, if sector 1104 is taken as a sector to be compared by the number comparing unit 202, after a determination has been made in operation S1207, operations S1206 and S1207 are repeated because the head number and track number of sector 1104 are the same as the head number and track number of the sector 1103 that are stored in the number information storage unit 209.

If the number comparing unit 202 determines in operation S1207 that the obtained head number or track number differs from the head number or track number stored in the number information storage unit 209, the number comparing unit 202 sends a notification to the track data length calculating unit 203. Upon receipt of the notification from the number comparing unit 202, the track data length calculating unit 203 calculates the data length of sectors from sector 1103 to the current sector, which is, for example, a sector having an LBA that is 0x80 larger than the LBA of the sector in which a different head number or a different track number has been detected by the number comparing unit 202 (in FIG. 11, the current sector is sector 1104). The track data length calculating unit 203 stores the calculated data length in the track information storage unit 210 as an approximate value of the data length of the innermost track (S1208).

If, for example, sector 1105 is taken as a sector to be compared in operation S1207, a head number of 0x05 assigned to sector 1105 differs from a head number of 0x06, assigned to sector 1103, that is stored in the number information storage unit 209. Therefore, operation S1208 is executed by the track data length calculating unit 203; and the data length of sectors, illustrated in FIG. 11, from sector 1103 to a sector having an LBA that is 0x80 larger than the LBA of sector 1105 is calculated. If the calculated data length is, for example, 256 kilobytes, the track data length calculating unit 203 stores, in the track information storage unit 210, that an approximate value of the data length of the innermost track is 256 kilobytes.

An approximate value of the data length of the innermost track in the magnetic disk storage units 105 and 106 is calculated by the procedure described above.

Since the head numbers and track numbers of sectors are obtained in 0x80 increments, an approximate value of the data length of a track may be obtained by a smaller amount of calculation or in a shorter calculation time.

If the data length of a track on a platter included in a magnetic disk storage unit is unknown, the data length of the track or its approximate value may be calculated.

Although the converter 201 obtains the head numbers and track numbers of sectors in 0x80 increments, this increment may be appropriately changed according to the specifications of the storage unit. If, for example, the minimum value of the data length in data processing executed by the controller 100 is 64 kilobytes and the length of data storable in one sector is 512 bytes, the head numbers and track numbers of sectors may be obtained in 0x80 increments. Data processing executed by the controller 100 may be less affected, and the data lengths of tracks may be calculated more efficiently. After the data length of the outermost track and the data length of the innermost track have been calculated, the storage areas in the magnetic disk storage units 105 and 106 are divided. An approximate value of the data length of the track may be used, or the calculated data length of the track may be used. Alternatively, information that has been obtained in advance may be used.

A zone may be a group of a plurality of blocks. The data lengths of blocks belonging to the same zone are set to the same value. For example, in a zone on the outer side of a platter, as the data length of, for example, one track becomes longer, the data length of the block is set to a larger value. Since zones and the data lengths of blocks are set in this way, as the data length of the track becomes longer, the data length of the block is set to a larger value. Even if the data length of the block becomes long, the number of seeks performed by the magnetic head to scan sectors and a time taken for the seeks may be reduced.

FIG. 13 indicates an example of an expression to calculate the number of zones. The zone count determining unit 204 determines the number of zones into which the entire data area is to be divided according to the expression indicated in FIG. 13. The determined number of zones may be described as the zone count. In the expression indicated in FIG. 13, the zone count is calculated as the value obtained by dividing the difference between the data length of the outermost track and the data length of the innermost track by a data length equal to an interval at which the converter 201 obtains the head numbers and track numbers of sectors and adding 1 to the division result. For example, the zone count may be "((data length of outermost track)−(data length of innermost track))÷(interval at which sectors are identified)+1".

For example, the maximum value of the data lengths of the blocks may be 512 kilobytes, which is an approximate value of the calculated data length of the outermost track. For example, the minimum value of the data lengths of the blocks may be 256 kilobytes, which is an approximate value of the calculated data length of the innermost track. When, for example, the minimum value of the data lengths in data processing executed by the controller 100 is 64 kilobytes, the zone count is 5 obtained by ((512−256)÷64+1=5). Accordingly, the zone count determining unit 204 determines that the entire data area is to be divided into five zones.

After the zone count determining unit 204 has determined the zone count, a zone number is assigned to each zone as an identifier that identifies the zone. The zone number may be a serial number unique to a particular zone. For example, the zone number of the outermost zone may be set to 0, and the zone number of a zone that is one zone inside the zone having the zone number 0 may be set to 1. Zone numbers may be assigned similarly up to the innermost zone so that zone numbers 0 to 4 are assigned to identify the five zones. The zones corresponding to the zone numbers 0 to 4 may be described as zones #0 to #4.

After the zone count and zone numbers have been determined, the block data length determining unit 205 determines a data length per block for each zone determined by the zone count determining unit 204.

The block data length determining unit 205 determines the data length of the blocks in zone #0 to be 512 kilobytes, which is the maximum value of the data lengths of the blocks. The block data length determining unit 205 determines the data length of the blocks in zone #1 to be 448 kilobytes, which is obtained by subtracting 64 kilobytes from 512 kilobytes. The data lengths of the blocks in the other zones are determined similarly. For example, the data length of the blocks in zone #4 may be determined to be 256 kilobytes, and a 64-kilobyte longer data length may be assigned to blocks each time the zone number is decreased by one.

After a data length per block has been determined for each zone, the block data length determining unit 205 stores the data length in the zone information storage unit 211 in correspondence to the zone number of the zone.

FIG. 14 illustrates an example of information stored in the zone information storage unit 211. The data length per block in each zone may be stored in the zone information storage unit 211 in a data structure as illustrated in zone information 1400 in FIG. 14.

After the zone count and the data length per block in each zone have been determined, the data area calculating unit 206 obtains a ratio by which each zone occupies the entire data area on a platter included in the magnetic disk storage unit.

FIG. 15 indicates an expression to calculate a ratio of a data area. The expression in FIG. 15 obtains a ratio of a data area allocated for each zone to the entire data area. The zone count indicates the number of zones in the entire data area. The zone number indicates the number assigned to a zone during the execution of the procedure, described above, for dividing the data area.

In zone #0, for example, since the zone count is 5 and the zone number is 0, a ratio of the data area occupied by zone #0 to the entire data area is determined to be 36% according to the expression in FIG. 15. The data area calculating unit 206 stores the calculated ratio in the zone information storage unit 211 in correspondence to the zone number.

As for zones other than zone #0 as well, a ratio of the data area occupied by each zone to the entire data area is determined similarly, and the determination result is stored in the zone information storage unit 211.

FIG. 16 illustrates an example of information stored in the zone information storage unit 211. Data area information 1600 illustrated in FIG. 16 may be stored in the zone information storage unit 211.

The data length of each block is determined by the procedure described above when the data area of the magnetic disk storage unit is divided. Access speeds in blocks in outer tracks are faster than access speeds in blocks in inner tracks, so the blocks in the outer tracks are divided so that a longer data length is set for each block when compared with the blocks in the inner tracks. Accordingly, when, for example, a case in which data is read from a block in an outer track and a case in which data having the same data length as the above data is read from a block in an inner track are compared, the number of I/O accesses to the block in the outer track is smaller than in the inner track. This may reduce a processing load on the storage unit.

The outer on the platter the track is, the longer the data length of each block in the track is. The inner on the platter the track is, the shorter the data length of each block in the track is. Access speeds in blocks in inner tracks on a platter are slower than access speeds in blocks in outer tracks on the platter, so the blocks in the inner tracks are divided so that the data lengths per block are set to small values according to the degree of reduction in the access speed. This may reduce variations in times taken to access data in different blocks.

Figure 17:
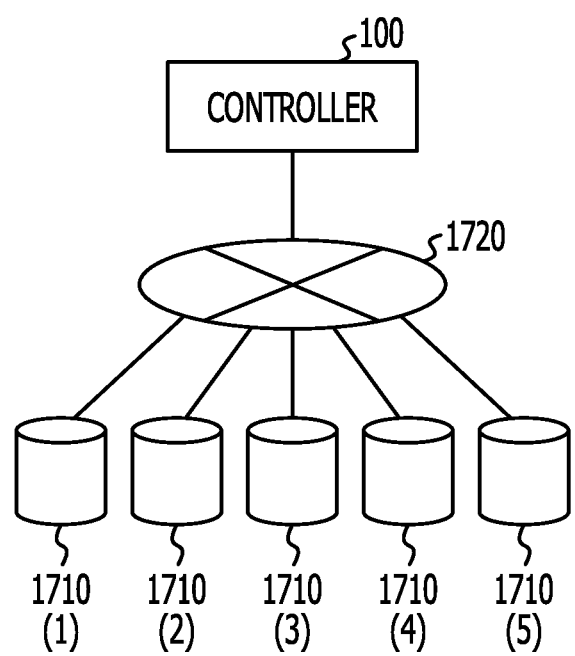
FIG. 17 illustrates an example of a hardware structure.

FIG. 17 illustrates an example of a hardware structure. In the storage unit in FIG. 17, one controller 100 and five magnetic disk storage units 1710(1) to 1710(5) are mutually coupled through a network 1720. Redundant arrays of inexpensive disks (RAID) or redundant arrays of independent disks (RAID) 5 (4+1) may be applied.

The data area in a magnetic disk storage unit may have been evenly divided into 0x80-sector areas. The magnetic disk storage units 105 and 106 illustrated in FIG. 1 and the magnetic disk storage units 1710(1) to 1710(5) may be substantially identical or similar hardware. The network 1720 may be, for example, a fiber channel or an SAN.

For example, an access to data stored in zone #4 may be made. The data length per block in zone #4 illustrated in FIG. 16 may be 256 or 64 kilobytes.

In the form of RAID 5 (4+1), sequential read/write accesses may be made in a magnetic disk storage unit.

Figure 18:
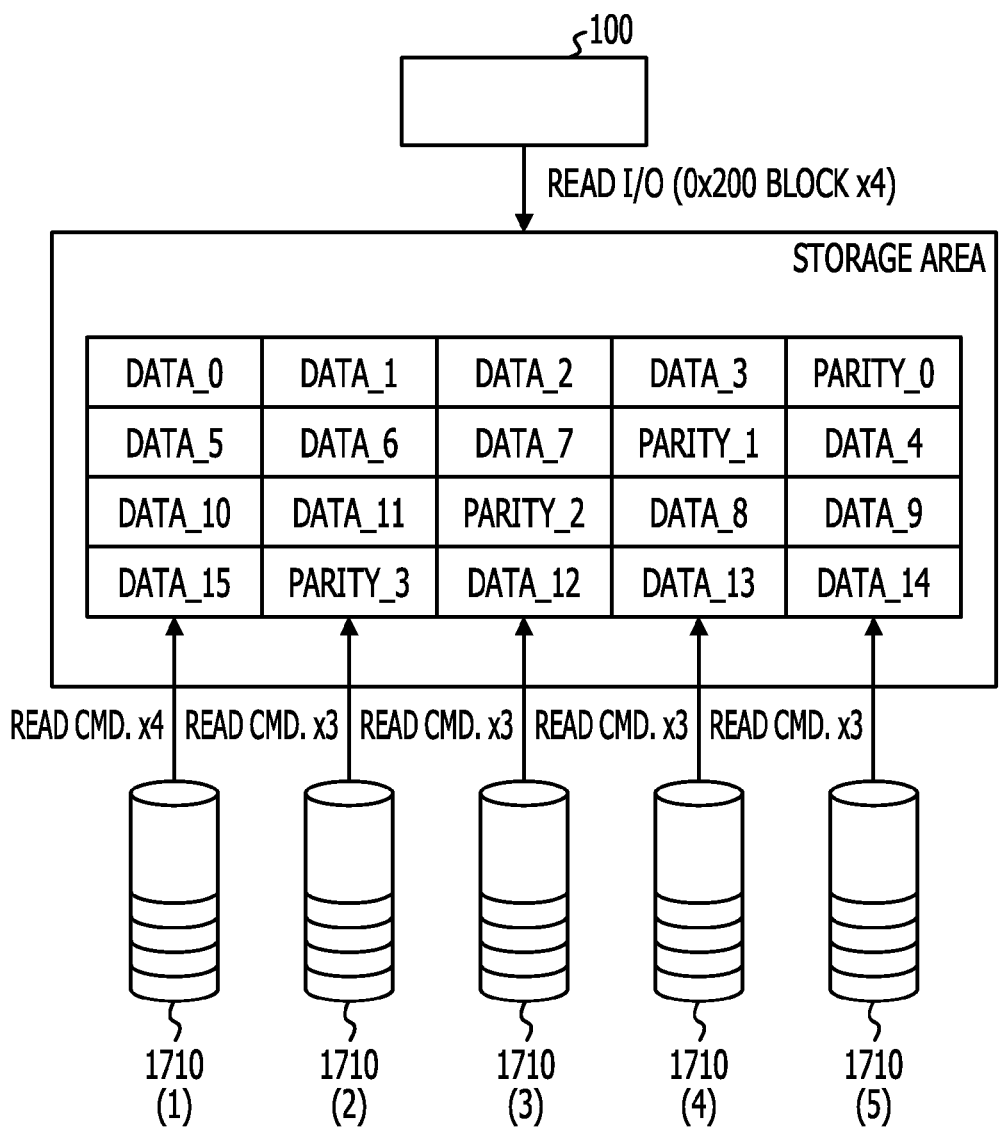
FIG. 18 illustrates an example of a magnetic disk storage unit.
Figure 19:
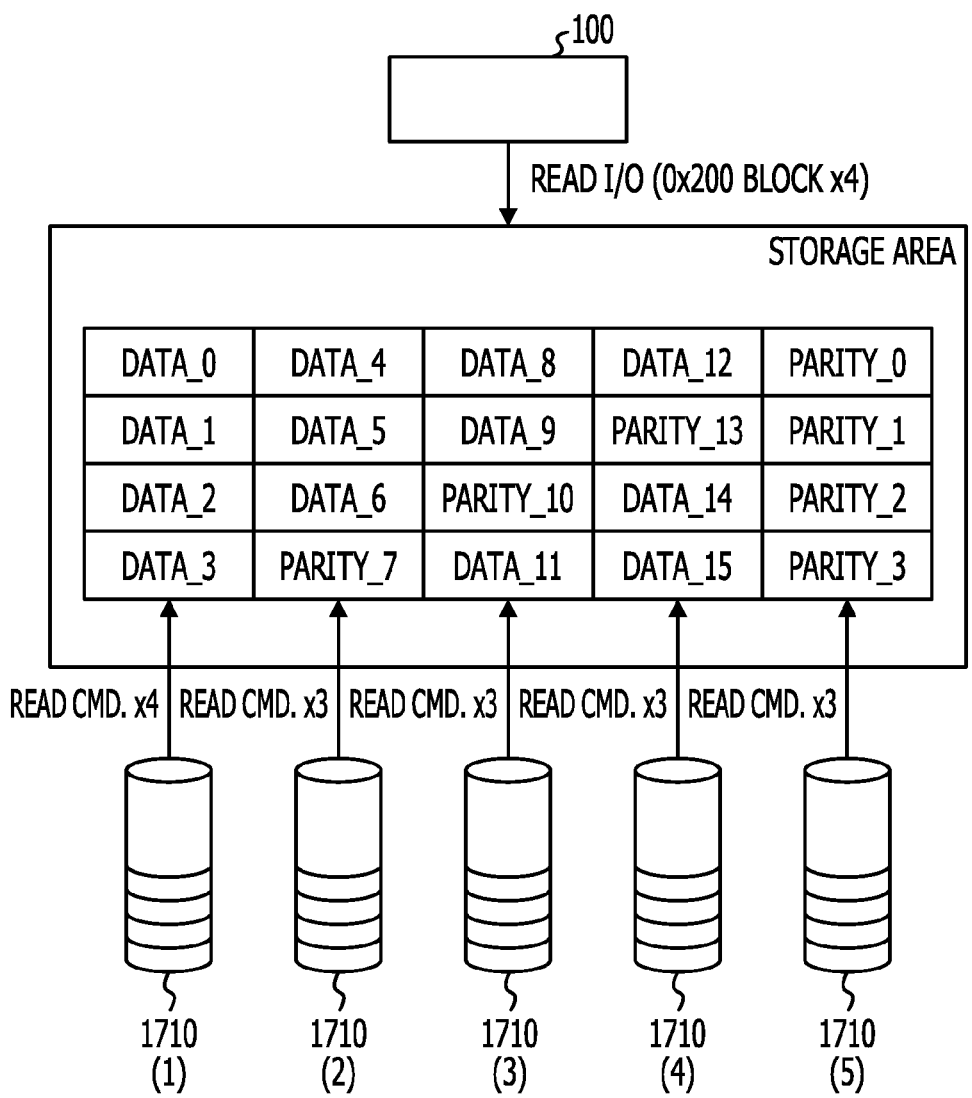
FIG. 19 illustrates an example of a magnetic disk storage unit.

FIGS. 18 and 19 each illustrate examples of magnetic disk storage units. In FIGS. 18 and 19, sequential read/write accesses are made in the magnetic disk storage units.

In FIG. 18, the data area on each platter is divided into 64-kilobyte areas. Accordingly, to read data from four times 0x200 sectors, 20 I/O accesses may be made in the entire magnetic disk storage unit.

In FIG. 19, the data area on each platter is divided into 256-kilobyte areas. Therefore, to read data from four times 0x200 sectors, four I/O accesses may be made in the entire magnetic disk storage unit. When compared with the case in FIG. 18, the number of I/O accesses is reduced and the processing load on the storage unit may be reduced. Since 256 kilobytes is an approximate value of the data length per track in zone #4, although the data length per block is increased, the number of seeks performed by the magnetic head to scan sectors and a time taken for the seeks may be reduced.

In a magnetic disk storage unit, access performance involved in sequential read/write accesses may be improved.

Figure 20:
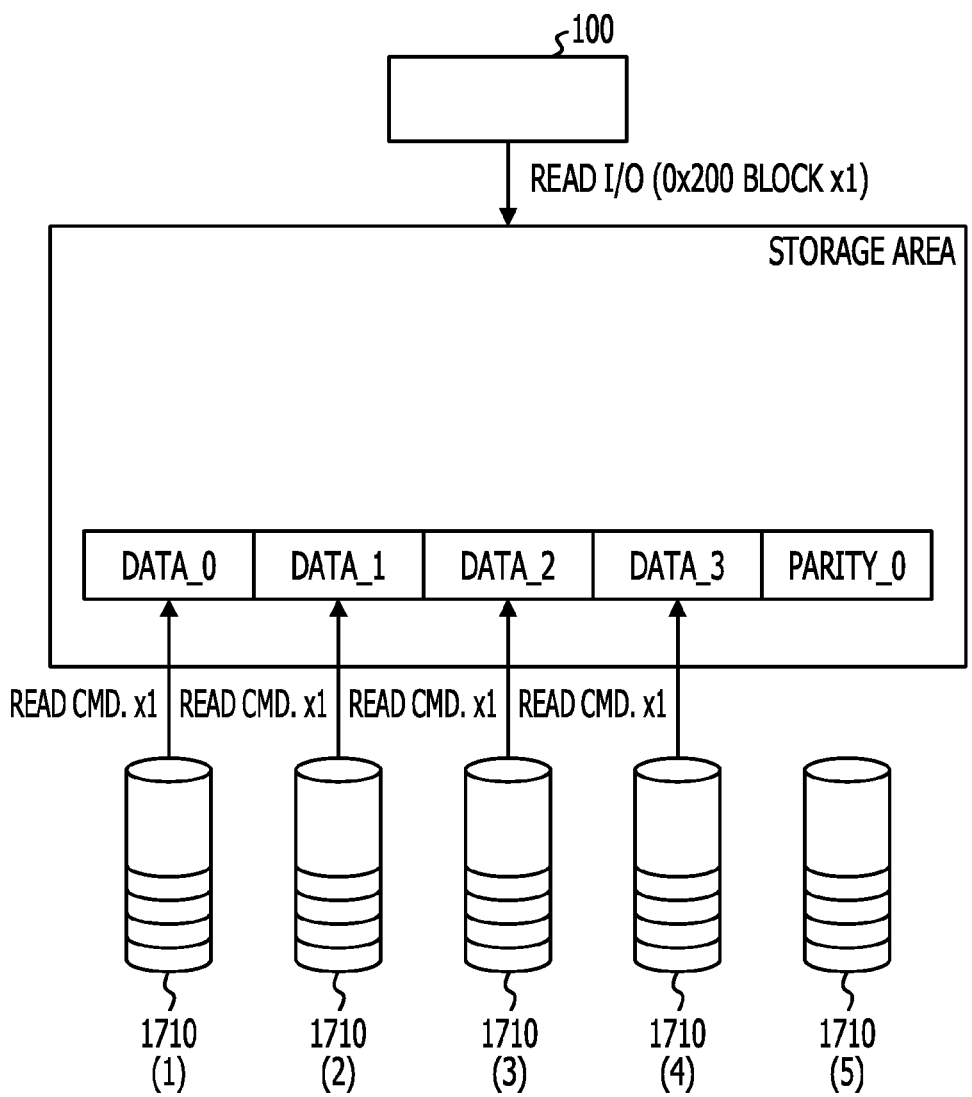
FIG. 20 illustrates an example of a magnetic disk storage unit.
Figure 21:
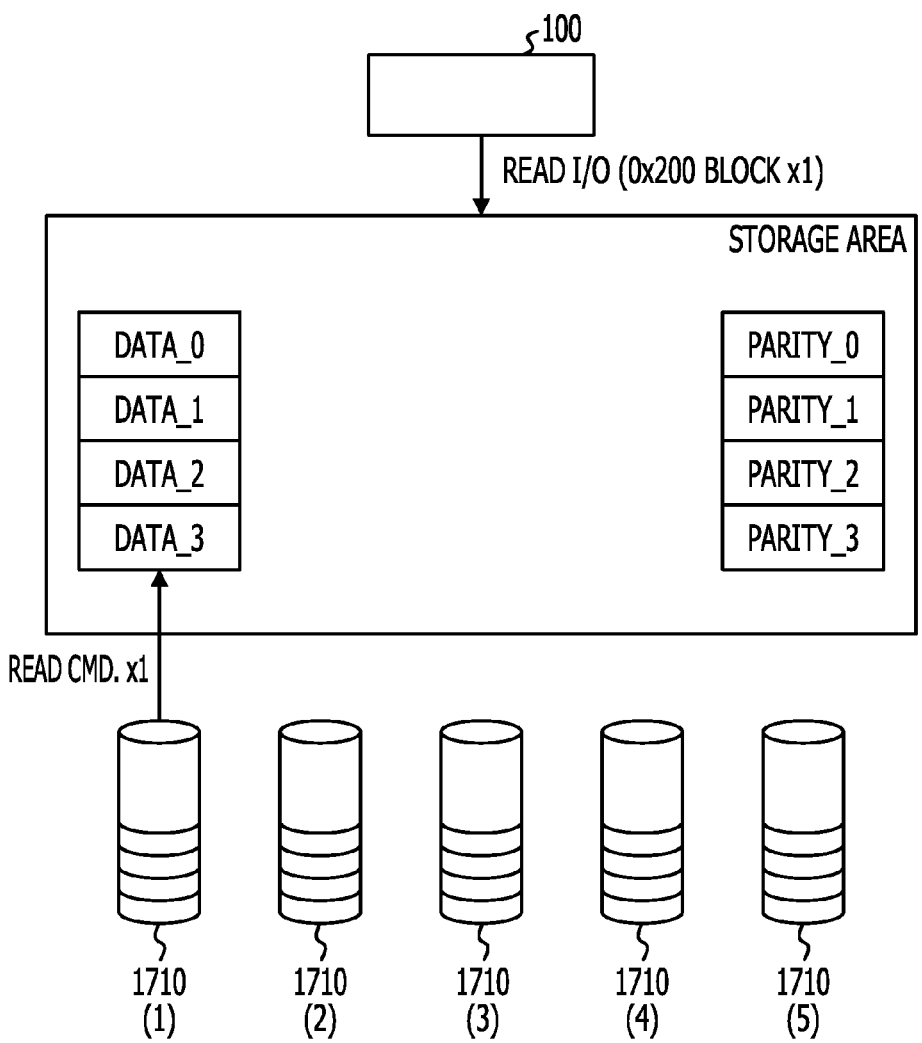
FIG. 21 illustrates an example of a magnetic disk storage unit.

FIGS. 20 and 21 each illustrate examples of magnetic disk storage units. In FIGS. 20 and 21, random read/write accesses are made in the magnetic disk storage units.

When, for example, the data area on each platter is divided into 64-kilobyte areas, four I/O accesses may be made to read data from 0x200 sectors in the entire magnetic disk storage unit. Data is divided into 64-kilobyte segments and is stored in four magnetic disk storage units, so an I/O access may be made in each of the four magnetic disk storage units.

In the case of a magnetic disk storage unit, the data area on a platter may be divided into 256-kilobyte areas. Accordingly, the number of I/O accesses to be made to read data from 0x200 sectors is 1 in the entire magnetic disk storage unit, so the number of I/O accesses may be reduced. Since 256 kilobytes is an approximate value of the data length per track in zone #4, although the data length per block is increased, the number of seeks performed by the magnetic head to scan sectors and a time taken for the seeks may be reduced.

In a magnetic disk storage unit, access performance involved in random read/write accesses may be improved.

For example, in the form of RAID 5 (4+1) illustrated in FIG. 17, the number of seeks performed by the magnetic head to scan sectors, a time taken for the seeks, and I/O accesses may be reduced. The processing load on the controller 100 may be reduced due to the reduction in I/O accesses.

An access to data stored in zone #4 may be made. For zones other than zone #4 as well, a data length per block may be determined according to the data length per track in each zone. Accordingly, access performance in zones other than zone #4 may be improved.

The data length per track on a platter included in the magnetic disk storage unit may be automatically calculated. The storage area in the magnetic disk storage unit may be suitably divided by using the automatically calculated data length per track.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method of controlling a disk storage unit, comprising:
   obtaining, by a computer, for a plurality of sectors allocated on a disk included in the disk storage unit, track identifying information that identifies a track to which sectors belong, in a first order starting from a start sector having a start track identifying information;
   comparing first track identifying information obtained in a first sector of the plurality of sectors with the start track identifying information;
   comparing second track identifying information obtained in a second sector of the plurality of sectors which is obtained prior to the first sector in the first order with the start track identifying information; and
   storing, if first track identifying information does not match the start track identifying information and the second track identifying information matches the start track identifying information, a data length from the start sector to the second sector in a storage unit.

2. The control method according to claim 1, further comprising:
   obtaining first disk plane identifying information that identifies a disk plane to which sectors belong in the first sector and second disk plane identifying information in the second sector; and
   storing, if the first disk plane identifying information does not match start disk plane identifying information in the start sector and the second disk plane identifying information matches the start disk plane identifying information, a data length from the start sector to the second sector in the storage unit.

3. The control method according to claim 1, wherein the first order is an ascending order or a descending order of serial numbers assigned to sectors from sectors allocated in a track on an outer side of the disk to sectors in a track on an inner side of the disk.

4. The control method according to claim 1, wherein the first order is an ascending order of logical block addresses assigned to sectors.

5. The control method according to claim 1, wherein the track identifying information is obtained for the plurality of sectors at an interval.

6. The control method according to claim 2, wherein the track identifying information or the disk plane identifying information is obtained for the plurality of sectors at an interval.

7. The control method according to claim 1, further comprising:
dividing an entire data length of the disk into a plurality of data lengths based on at least one of a maximum data length and a minimum data length of data lengths stored in the storage unit.

8. The control method according to claim 7, further comprising:
dividing the entire data length of the disk into a plurality of data lengths by using the maximum data length as a maximum division unit or by using the minimum data length as a minimum division unit; and
increasing data lengths to be divided by a certain increment, starting from a track on an inner side of the disk toward a track on an outer side of the disk.

9. A control method of controlling a disk storage unit, comprising:
obtaining, by a computer, for a plurality of sectors allocated on a disk included in the disk storage unit, disk plane identifying information that identifies a disk plane to which sectors belong, in an order starting from a start sector having a start disk plane identifying information;
comparing first disk plane identifying information obtained in a first sector of the plurality of sectors with the start disk plane identifying information;
comparing second disk plane identifying information obtained in a second sector of the plurality of sectors which is obtained prior to the first sector in the order with the start disk plane identifying information; and
storing, if first disk plane identifying information does not match the start disk plane identifying information and the second disk plane identifying information matches the start disk plane identifying information, a data length of sectors from the start sector to the second sector in a storage unit.

10. The control method according to claim 9, wherein the disk plane identifying information is obtained for the plurality of sectors at an interval.

11. A system that controls a disk storage unit, the system comprising:
a memory that stores a control program to control the disk storage unit; and
a central processing unit (CPU) that executes the control program,
wherein the control program includes operations of:
obtaining, for a plurality of sectors allocated on a disk included in the disk storage unit, track identifying information that identifies a track to which sectors belong, in a first order starting from a start sector having a start track identifying information;
comparing first track identifying information obtained in a first sector of the plurality of sectors with the start track identifying information;
comparing second track identifying information obtained in a second sector of the plurality of sectors which is obtained prior to the first sector in the first order with the start track identifying information; and
storing, if first track identifying information does not match the start track identifying information and the second track identifying information matches the start track identifying information, a data length from the start sector to the second sector in a storage unit.

12. The system according to claim 11, the control program further including operations of:
obtaining first disk plane identifying information that identifies a disk plane to which sectors belong in the first sector and second disk plane identifying information in the second sector; and
storing, if the first disk plane identifying information does not match start disk plane identifying information in the start sector and the second disk plane identifying information matches the start disk plane identifying information, a data length from the start sector to the second sector in the storage unit.

13. The system according to claim 11, wherein the first order is an ascending order or a descending order of serial numbers assigned to sectors from sectors allocated in a track on an outer side of the disk to sectors in a track on an inner side of the disk.

14. The system according to claim 11, wherein the first order is an ascending order of logical block addresses assigned to sectors.

15. The system according to claim 11, wherein the track identifying information is obtained for the plurality of sectors at an interval.

16. The system according to claim 12, wherein the track identifying information or the disk plane identifying information is obtained for the plurality of sectors at an interval.

17. The system according to claim 11, the control program further including operations of:
dividing an entire data length of the disk into a plurality of data lengths based on at least one of a maximum data length and a minimum data length of data lengths stored in the storage unit.

18. The system according to claim 17, the control program further including operations of:
dividing the entire data length of the disk into a plurality of data lengths by using the maximum data length as a maximum division unit or by using the minimum data length as a minimum division unit; and
increasing data lengths to be divided by a certain increment, starting from a track on an inner side of the disk toward a track on an outer side of the disk.

* * * * *